W. H. CONVERSE.
Roller and Harrow.

No. 47,090,  Patented Apr. 4, 1865.

Witnesses:  Inventor:

UNITED STATES PATENT OFFICE.

WM. H. CONVERSE, OF NEW CASTLE, MAINE.

IMPROVED HARROW AND ROLLER COMBINED.

Specification forming part of Letters Patent No. 47,090, dated April 4, 1865.

*To all whom it may concern:*

Be it known that I, WILLIAM H. CONVERSE, of New Castle, in the county of Lincoln and State of Maine, have invented a new and Improved Combined Harrow and Roller; and I do hereby declare that the following is a full, clear, and exact description thereof, which will enable others skilled in the art to make and use the same, reference being had to the accompanying drawings, forming part of this specification, in which—

Figure 1:
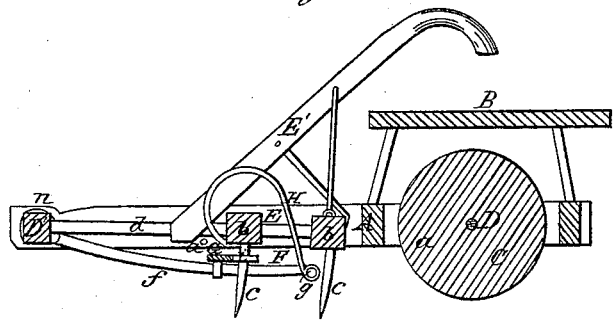
Figure 2:
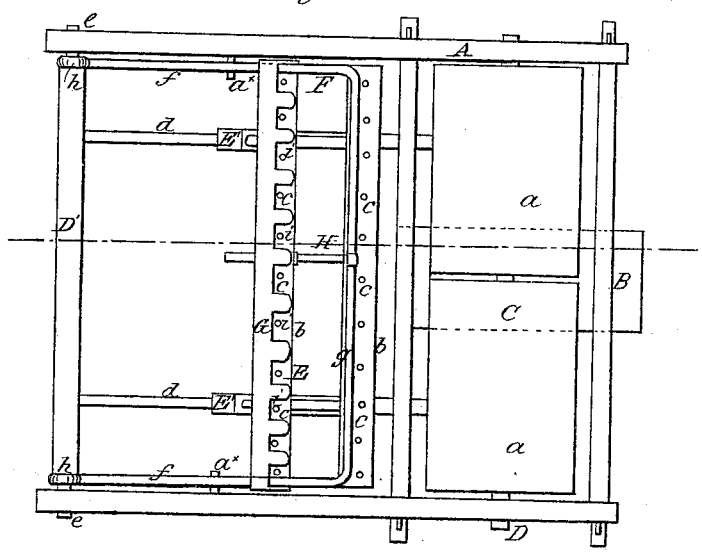

Figure 1 is a side sectional view of my invention; Fig. 2, an inverted plan of the same.

Similar letters of reference indicate like parts.

This invention consists in combining a harrow with a roller and arranging the former in such a manner that it may be readily cleaned from weeds and trash which may engage or become entangled in its teeth, and also be capable of yielding to conform to the inequalities of surface over which it may pass.

A represents a rectangular frame, on the rear part of which the driver's seat B is secured, and the roller C is fitted on an axis, D, in the rear part of the frame, the roller being composed of two parts, $a$ $a$, of equal length, placed loosely on the axis.

E is the harrow composed of two parallel bars, $b$ $b$, which are parallel with the roller C and are provided with teeth $c$. The bars $b$ $b$ are fitted on two parallel rods, $d$ $d$, which are at right angles to $b$ $b$, and are attached at their front ends to a shaft, D′, the journals $e$ of which are allowed to work or turn freely in the sides of the frame A at its front end. Each rod $d$, having a handle, E′, the latter extending back to within convenient reach of the driver on seat B, as shown in Fig. 1.

F is a bar or rod bent in bail form, so as to have two parallel sides, $f$ $f$, and a rear piece, $g$, the latter being directly under the hindmost bar $b$ of the harrow and nearly or quite in contact with its teeth $c$. The sides $f$ $f$ of said bar are parallel with the sides of the frame A and adjoin them, and they have their front ends bent in the form of circular eyes $h$, which are fitted loosely on shaft D′.

G is a plate the ends of which are connected to the sides $f$ $f$ of the bar F. This plate is parallel with the rear part, $g$, of F, and it has notches $i$ made in it, through which the teeth of the front bar $b$ pass, (see Fig. 2,) said plate G being directly under the front bar $b$ of the harrow.

H is a spring one end of which is attached to the front bar $b$ of the harrow and the other end attached to the rear piece or part, $g$, of the bar F, said spring having a tendency to keep the plate G and the rear part, $g$, of F elevated and nearly in contact with the bars $b$ $b$ of the harrow.

From the above description it will be seen that as the implement is drawn along the harrow E will be allowed to rise and fall to conform to the inequalities of the surface of the ground over which it may pass, in consequence of the shaft D being allowed to turn freely in its bearings; and in case the harrow-teeth $c$ should at any time become choked or clogged with weeds, grass, and trash, the operator or driver, by simply raising the harrow through the medium of the handles E′ will cause the teeth to rise, while the plate G and rear part, $g$, will strip the weed, grass, or trash from the teeth, the bar F being prevented from rising with the harrow by means of pins $a^x$ in frame A.

Thus by this simple arrangement a harrow and roller are combined and an implement which may be constructed at a moderate expense and operate in a perfect manner for covering seed and rolling and compacting the earth upon it obtained.

I would remark that a seed-distributing device may be placed on the front part of the frame A, constructed and arranged in any suitable way, so that the three operations of sowing seed, harrowing in, and rolling the same may be performed simultaneously.

I claim as new and desire to secure by Letters Patent—

The harrow E, fitted in or to the frame A, substantially as shown, in combination with the bent bar F, provided with the plate G and a rear part, $g$, having a relative position with the harrow-teeth $c$, as described, the sides $f$ $f$ of F being fitted loosely on the harrow-shaft D, and the bar F and harrow E connected by a spring, H, the above parts being applied to the frame A of a roller, C, and all arranged to operate substantially as set forth.

WILLIAM H. CONVERSE.

Witnesses:
WM. JOHNSTON,
E. WRIGHT.